Patented Jan. 26, 1943

2,309,488

UNITED STATES PATENT OFFICE 2,309,488

BAKING UTENSIL COATING MATERIAL

Rene Wassermann, New York, N. Y.

No Drawing. Application March 21, 1940,
Serial No. 325,128

4 Claims. (Cl. 99—123)

This invention relates to a product for coating baking plates, moulds and other utensils used for the making of bread, cake, biscuits and other baked foodstuffs.

Pots, pans and other utensils used for baking purposes are usually dressed by the application of a coating of grease or butter. This coating allows the freeing of water during the baking process, which penetrates into the dough and produces cooked or carbonized residues, particularly since grease can burn during the heating. After every baking, it is usually necessary to scrape or wash off these residues and to clean the utensils. Another drawback resulting from the use of butter and grease is that they oxidize quickly and become rancid, transmitting the rancid taste to the baked goods.

An object of the present invention is to avoid these drawbacks by the use of a different and novel product as a dressing for baking utensils, said product being of such nature that it does not change or transmit any taste, rancid or otherwise, to the baked goods even after being preserved for a very long period of time, and that the baking utensils remain perfectly smooth and clean after the baking whenever this product is used.

Other objects of the present invention will become apparent in the course of the following specification.

The objects of the present invention may be realized through the provision of a coating product comprising the mixture of a comparatively small amount of wax with a larger amount of hydrogenized or oxydized substantially solidified esculent oil or fat. A small amount of a non-hydrogenized liquid esculent oil may be added to the mixture which acquires a semi-solid viscous consistency. The relative proportion of these ingredients may vary within a wide range, depending upon the climate, the season and the desired consistency or viscosity of the finished product.

Any suitable vegetable, animal or mineral wax may be used in the mixture, such as beeswax, Chinese wax known under the name "Pi-La," palm wax or Japanese wax. Of mineral waxes, paraffin and ceresin were found to be most suitable.

Any esculent oil in a substantially solid form resulting from hydrogenation or oxydation may be used in the mixture, such as a vegetable oil or animal oil. Good results were obtained with peanut oil, cotton seed oil, linseed oil, and soya beans oil. These oils may be conveniently substituted by cocoa oil, a nut oil, such as hazel nut oil, apricot stones oil and peach stones oil, or any animal oil.

The liquid oil which is added in small amounts to the mixture, may consist of any of the above mentioned oils, or of olive oil, almond oil or corn oil.

In accordance with the present invention, this coating product is manufactured, firstly, by hydrogenizing a liquid oil by placing this oil in vacuum, heating it gradually and then introducing hydrogen to the oil until it becomes substantially hard and of fatty consistency. This step may be substituted by the usual process of oxidizing.

To the required amount of the hydrogenized oil is added gradually a heated liquid oil until the mixture attains the required semi-liquid consistency and viscosity. Then a heated wax, which is emulsified with the afore-mentioned liquid oil, is gradually injected into the mixture. The mixture is heated to a temperature ranging between 50° C. and 80° C., preferably 67° C., is allowed to cool and then is transformed into a paste by a thorough kneading action of a kneading machine.

Because of the large number of mixtures which can be prepared according to the present invention, only a few are illustrated in the following specific examples, it being understood that these are typical examples of the large number of preparations included in the present invention and that the invention is not limited to such illustrations.

Example 1

To 2 kilograms of hydrogenized soya beans oil is added gradually and in small quantities somewhat less than 2 kilograms of heated Italian almond oil. Then 100 grams of Chinese "Pi-La" wax, emulsionated with the almond oil are gradually injected into the mixture. The mixture is heated to 67° C., is allowed to cool and kneaded to a paste in a kneading machine. The final product consists of:

| | |
|---|---|
| Italian almond oil | kilograms 2 |
| Hydrogenized soya beans oil | do 2 |
| "Pi-La" wax | grams 100 |

A substantially similar process may be used to make a coating consisting of other ingredients:

Example 2

The finished coating mixture may consist of:

| | Kilograms |
|---|---|
| Olive oil | 140 |
| Hydrogenized hard soya beans oil | 227 |
| "Pi-La" wax | 33 |

Example 3

A coating mixture consisting of:

| | | |
|---|---|---|
| Soya beans oil | kilograms | 2 |
| Hydrogenized solid soya beans oil | do | 2 |
| Beeswax | grams | 100 |

Example 4

A coating mixture consisting of:

| | | |
|---|---|---|
| Peanut oil | kilograms | 2 |
| Hydrogenized solid peanut oil | do | 1 |
| Beeswax | grams | 100 |

Example 5

A coating mixture consisting of:

| | Pounds |
|---|---|
| Hydrogenized solid cottonseed oil | 8 |
| Liquid corn oil | 2 |
| Beeswax | 1 |

The described coating products usually have the appearance of colorless, practically transparent greasy compounds having a viscosity similar to that of Vaseline. A brush may be used for covering the inner surfaces of a baking utensil with a thin layer of this product before dough or other foodstuffs are placed into the utensil. The product is applied while it is cold, without being heated.

Tests and practical experience have shown that when pastry and other food products baked in a utensil coated in the described manner are removed from the utensil, they have smooth, even surfaces which are devoid of any carbonized residues. Hot pastry has a slightly agreeable greasy flavor which becomes practically imperceptible when the pastry is cooled.

This may be explained by the fact that the coating product made in accordance with the principles of the present invention does not free any water or develop any steam during the baking, so that no water is precipitated, but forms a greasy and impenetrable film or layer which prevents the product itself from penetrating into the foodstuff while it is being baked. Thus, the necessity of scraping the utensils after baking is effectively avoided.

A surprising feature of the coating product is that it can remain exposed and unused for a lengthy period of time, namely, from five months to a number of years, even in a tropical climate or even if subjected to intermittent heating, without suffering any changes which would affect its use or composition. Foodstuffs which were baked while this product was used, remain fresh and do not acquire an unpleasant rancid taste.

On the other hand, butter and grease and unsaturated fatty acids in general absorb gradually oxygen from atmospheric air and become rancid in time. It is a matter of common knowledge that butter and grease contained in the bottom portions of pastry which has remained for a period of time in the bakery, become rancid and spoil the taste of the pastry.

The action and effect of a coating mixture prepared in accordance with the present invention are entirely different from those of the individual components of the mixture. An oil may start to burn during the baking, even though it was hydrogenated prior to its use. Oils may become rancid, while the coating mixture does not become rancid itself, does not transmit any rancid taste to the foodstuffs and prevents the transmission of any other substances, which may become rancid, to the foodstuffs. Wax and oil have unpleasant tastes, which are transmitted to the baked product if wax or oil are used separately. On the other hand, the mixture of a hydrogenated oil with unhydrogenated liquid oil and wax, made according to the present invention, neutralizes any unpleasant taste which the separate ingredients may have.

It can thus be seen that there has been provided according to this invention a baking utensil coating which consists of a mixture of hydrogenated vegetable oil with a part of said oil in unhydrogenated state, said unhydrogenated and said hydrogenated oil being present in the mixture in proportions ranging from about 1:1 to 1:4, and an additional amount of beeswax forming a relatively small proportion with respect to said mixture of said hydrogenated and said unhydrogenated vegetable oil.

Having thus described the invention what is claimed as new and desired to be secured by Letters Patent is:

1. A baking utensil coating material consisting of a mixture of a relatively large amount of hydrogenated vegetable oil and of a relatively small amount of vegetable oil in unhydrogenated state, said unhydrogenated and said hydrogenated oils being present in the mixture in such proportions as to obtain a semi-liquid consistency of the material, and an addition of beeswax forming a relatively small proportion with respect to said mixture of said hydrogenated and said unhydrogenated vegetable oils.

2. A baking utensil coating material consisting of a mixture of hydrogenated vegetable oil with a part of said oil in unhydrogenated state, said unhydrogenated and said hydrogenated oil being present in the mixture in proportions ranging from about 1:1 to 1:4, and an additional amount of beeswax forming a relatively small proportion with respect to said mixture of said hydrogenated and said unhydrogenated vegetable oil.

3. A baking utensil coating material consisting of a mixture of hydrogenated peanut oil and of unhydrogenated peanut oil, said unhydrogenated and said hydrogenated peanut oil being present in the mixture in a ratio of about 1 to 2, and a small addition of beeswax incorporated in said mixture of said hydrogenated and said unhydrogenated peanut oil.

4. A material according to claim 2, wherein said vegetable oil is cottonseed oil.

RENE WASSERMANN.